Sept. 7, 1954 D. K. HART ET AL 2,688,248
BALANCED PRESSURE ENGINE INDICATOR
Filed Jan. 24, 1951 2 Sheets-Sheet 1
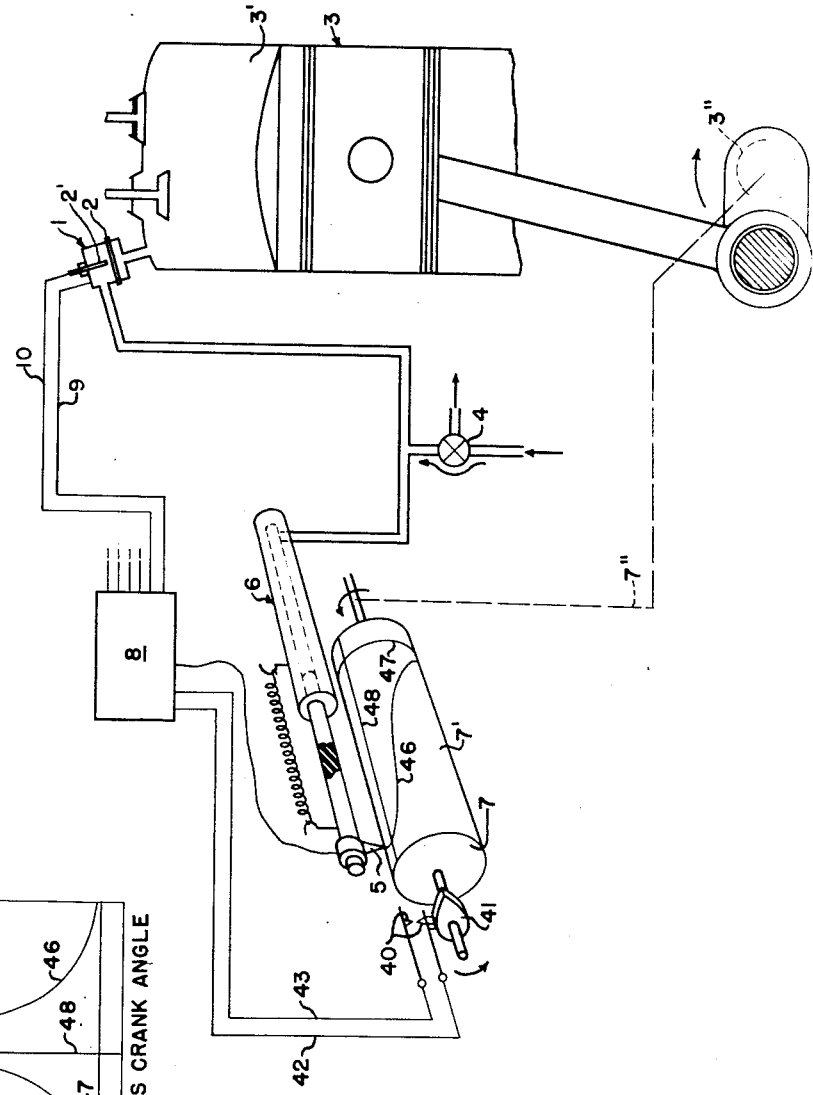
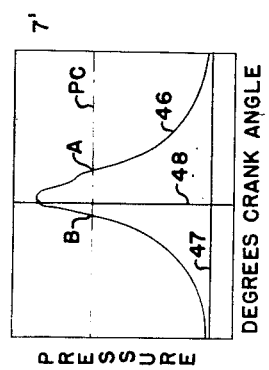
INVENTORS
D. K. HART
D R CHURCH
BY
ATTYS Sept. 7, 1954     D. K. HART ET AL     2,688,248
BALANCED PRESSURE ENGINE INDICATOR
Filed Jan. 24, 1951     2 Sheets-Sheet 2

INVENTORS
D. K. HART
D. R. CHURCH
BY
ATTYS.

Patented Sept. 7, 1954

2,688,248

UNITED STATES PATENT OFFICE 2,688,248

BALANCED PRESSURE ENGINE INDICATOR

David K. Hart and Donald R. Church, Berwyn, Md.

Application January 24, 1951, Serial No. 207,644

5 Claims. (Cl. 73—115)

(Granted under Title 35, U. S. Code (1952), sec. 266)

This invention relates generally to engine indicators and more particularly to a balanced pressure type of mechano-electronic high speed indicator to record instantaneous cylinder pressures with respect to the angle of rotation of the crankshaft or cylinder volume in reciprocating engines, compressors, pumps, or the like.

Heretofore, balanced pressure indicators for plotting engine pressures relative to volume or crank angle have been employed in which a stylus is caused to move across a cylindrical chart connected to and rotating with the engine crankshaft. Electronic circuits are used with this arrangement to convert engine-pressure variations detected by the pick-up unit of the pressure indicator to electrical discharges between the stylus and the drum and require that two passes of the stylus be made in order to record both the rise and fall of the pressure.

According to the arrangement of the present invention, there is provided a direct recording indicator which comprises a new and improved electronic circuit adapted to record a complete pressure-crank angle diagram in one pass of the pressure indicating stylus from low to high pressure or vice versa. The engine pressure indicator of this invention thus provides a saving of time over the prior art devices by a factor of approximately two in the taking of such diagrams.

An object of the present invention, therefore, is to provide a new and improved engine pressure indicator.

Another object is to provide a new and improved electronic circuit for use with a balanced pressure type engine indicator in which a complete pressure crank-angle diagram is made in one pass of the stylus over the drum.

A further object is to provide an electronic circuit to which the pick-up unit of a balanced pressure engine indicator may be coupled without restricting the open contact impedance of said pick-up, with its electrical wires, to over 200,000 ohms D. C. resistance.

A still further object is to provide an electronic circuit to which the pick-up unit of a balanced pressure engine indicator may be coupled without restricting the closed contact impedance of said pick-up to less than 5000 ohms D. C. resistance.

A still further object is to provide an electronic circuit employing a high tension spark coil in which oscillatory voltages in said coil are highly damped.

Other objects and many of the attendant advantages of this invention will be readily appreciated as the same becomes better understood by reference to the following detailed description when considered in connection with the accompanying drawings wherein:

Fig. 1 is a diagrammatic view of a balanced pressure indicating system employing the electronic circuit of the present invention;

Fig. 3 is a view of a typical indicator diagram or chart, unrolled.

Figure 2:
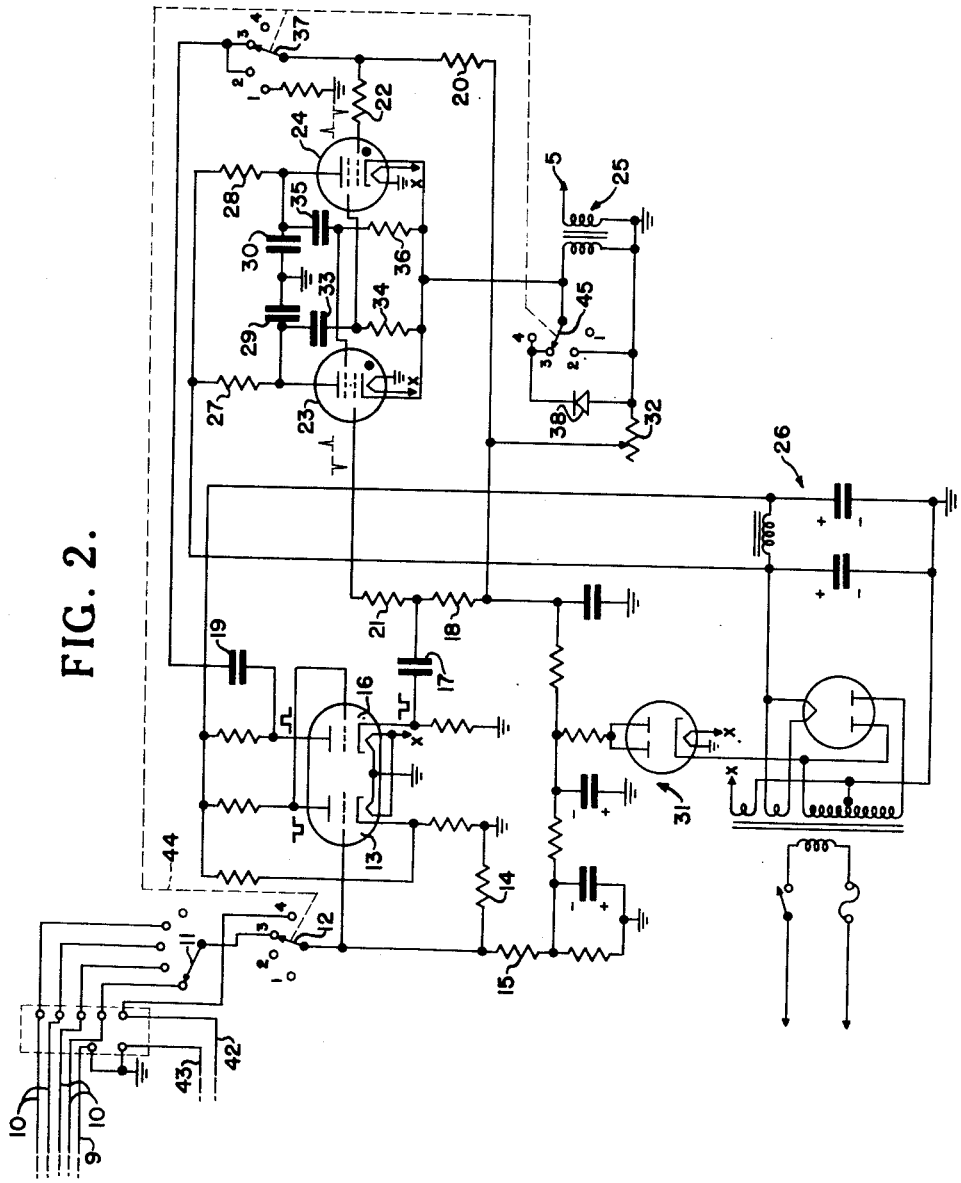
Fig. 2 is a diagrammatic view of the complete electronic circuit of the present invention.

Referring to Fig. 1, there is disclosed thereon, a pick-up transducer generally designated 1 containing a diaphragm 2, one side of which is exposed to the pressure in the chamber 3' under study and the other side of which is exposed to a calibrated applied pressure. Transducer 1 is secured to the engine 3 being tested in a manner suitable for the foregoing purpose. When the chamber pressure exceeds the applied pressure, the diaphragm deforms to close an electrical contact 2'. Likewise, when the chamber pressure thereafter diminishes, the circuit is opened. The applied pressure is controlled by valve 4.

A stylus 5, which comprises one side of a spark gap, is mounted on, or actuated by, a pressure-sensitive servo such as a piston-cylinder generally designated 6 which is motivated by the same calibrated pressure as applied to the pick-up transducer. The stylus moves adjacent and parallel to a drum 7 on which electrical recording paper 7' is wrapped, the drum being coupled to the engine shaft 3", as indicated by the dashed line 7", to run at the same speed and in accurate index to the engine.

The electronic circuit 8 is coupled between the output of the pick-up transducer 1 and the stylus 5 to convert the opening and closing of the pick-up contacts to electrical discharges from the stylus to the drum through the recording paper thereby marking the paper at the angular point corresponding to that of the engine at the time of contact closing or opening and at a point along the axis of the drum corresponding to the pressure in the chamber at the time of said contact action. For this purpose, the electronic circuit is connected to the pick-up transducer 2 by way of the ground conductor 9 and the signal conductor 10. The electronic circuit also provides for the indicating of a constant pressure line on the diagram and for the indicating of top dead center of the engine.

Referring now to Fig. 2 for a more detailed description of the specific structure and manner of operation of the electronic circuit 8, switches 11 and 12 provide for selection of a particular signal wire 10 from the pick-up transducer of the cylinder under test, and for connection thereof to the grid of the left-hand section 13 of a dual triode tube which is connected as a D. C. amplifier. It will be understood that the other signal wires 10 extend respectively to other transducers associated with the engine cylinder, exhaust manifold, or similar devices, which also may be selected for test by manipulation of switch 11.

When the pick-up contact is open, the grid of contact triode section 13 has a few volts of bias applied from a divider network consisting of resistors 14 and 15. The magnitude of this bias voltage is determined by the ratio of these resistances, and the effective input impedance of the electronic circuit is determined principally by the resistance of resistor 14. Thus, selection of the value of resistor 14 allows for the selection of any desired input impedance over a wide range.

By this means, the input impedance of the electronic circuit can be matched to the contact impedance of the pick-up transducer, and optimizing the value of resistor 14 allows the substantial matching and operation of the circuit over a wide range of contact impedances. When the pick-up contact closes, the transducer contacts are connected in parallel with resistor 14 and a signal is applied to the grid of tube section 13 which decreases the bias thereon.

The amplified signal from the plate of triode section 13 is direct-coupled to the grid of the right-hand section 16 of the dual triode, the plate and cathode of this tube being resistance loaded to serve as a phase inverter furnishing two outputs which are mirror images in a phase sense. These outputs are each differentiated by condenser resistor combinations 17, 18 and 19, 20, to produce sharp pulses or voltage spikes and these pulses are fed through grid resistors 21 and 22, respectively, to the grids of two gas thyratrons 23 and 24. The cathodes of these thyratrons are connected together and returned to ground through the primary of an auto ignition type spark coil 25.

A conventional type electronic power supply 26 furnishes plate voltage to the two thyratrons through plate resistors 27 and 28. Also connected to the plates of the thyratrons are condensers 29 and 30 both of which are charged from power supply 26 through resistors 27 and 28, respectively, and are returned to ground. Thus, when thyratron 24 is "fired" in response to the positive pulse supplied thereto upon closing of the pick-up contacts, its plate condenser immediately discharges causing a current surge through the "fired" tube and through the spark coil primary whereby a large "sparking" voltage is induced in the coil secondary, the resulting spark producing a mark on paper 7'. Loss of plate voltage caused by the condenser discharge extinguishes the fired thyratron whereupon the plate condenser recharges through the thyratron plate resistor.

When the pick-up contact opens, the triode voltages are restored to their initial values and concurrently therewith a positive pulse is applied to the grid of thyratron 23 whereupon this thyratron is fired. This causes condenser 29 to be discharged therethrough and thence through the coil 25 to produce a spark and mark on paper 7' in the same manner as heretofore described in connection with the firing of thyratron 24.

To allow for sensitivity adjustment of the circuit and to prevent the thyratrons from firing indiscriminately, an adjustable negative bias voltage is applied to both thyratron grids from a negative voltage supply 31 and a potentiometer 32.

Hence, in view of the foregoing, the signal produced by the closing of the pick-up contact is amplified, inverted, and differentiated to produce a negative voltage spike at the grid of thyratron 23, this negative spike having no effect on the plate current of thyratron 23. At the same time, this contact-closing signal appears as a positive voltage spike at the grid of thyratron 24 causing this tube to fire whereby a spark from stylus 5 to drum 7 is produced as aforedescribed, thus marking the recording paper. Conversely, the signal caused by the opening of the pick-up contact, produces a negative voltage spike at the grid of thyratron 24 and a positive voltage spike at the grid of thyratron 23, thus firing thyratron 23 and marking the recording paper in the manner previously described. Thus, even when the contact opens a few microseconds after its closing, two current surges in the ignition coil and correspondingly two marks on the recording paper are produced.

The firing of one of the thyratrons through the inductive primary of the spark coil would ordinarily tend to produce an oscillatory voltage in this coil which might fire the second thyratron. To prevent this possibility, a unilateral element, namely a selenium type rectifier 38, is connected in parallel with the primary of the ignition coil thus holding the cathodes of both thyratrons from reaching a negative potential at any time. Further protection against one thyratron firing the other is furnished by cross coupling networks 33, 34, 35 and 36 from each thyratron plate to the opposite thyratron shield grid which further biases the unfired tube.

In order to provide for indication of a constant pressure line on an indicator diagram, a switch 37 is turned to position 1 thereof to decrease the bias voltage on the grid of thyratron 24 whereby this tube is caused to fire repeatedly at a high rate determined by the RC constant of resistor 28 and condenser 30, thus marking the recording paper in a continuous constant pressure line.

A top dead center line can be indicated on the recording paper by a set of breaker points 40 which are operable in the usual manner from the drum shaft 41 to give a signal to the electronic unit by way of conductors 42 and 43 when the stylus is over top dead center. In this case, the switch 37 is rotated to position 4 thereof to remove the signal from the grid of thyratron 24 whereby only thyratron 23 is caused to fire at each opening of the breaker points. Switch 37 is ganged as indicated by the dashed line 44, to switches 12 and 45 whereby vibrator contacts 40 are connected to the grid of triode section 13 when switch 37 is moved to position 4. By reason of this arrangement, a traverse of the stylus over the pressure range produces a top dead center line on the diagram, the interrupter contacts being adjusted to open at top dead center.

Referring now to Fig. 3, the engine pressure is indicated on chart 7' by line 46 which is shown as a solid line but is actually a series of closely spaced marks resulting from the electrical discharges through the recording paper. Imaginary line Pc indicates a particular value of the pressure of the calibrated source which is varied slowly by adjustment of valve 4. Thus, a spark occurs at A when the pick-up diaphragm makes contact as a result of the engine pressure becoming equal to the particular calibrated pressure indicated and again at B when the contact 2' is opened as the engine pressure drops below the calibrated pressure. It will be understood that more than two points will appear on the chart during one revolution of the crankshaft when the pressure under test alternates more than twice with respect to the calibrated pressure as in the case of measurement of manifold pressures.

Line 47 represents the constant pressure line which may, for example, correspond to atmospheric pressure. Line 48 indicates the top dead center line, or if desired, may be caused to represent any other crank position by rotational adjustment of cam 41 with respect to the drum shaft.

As hereinbefore described and hereinafter claimed, it should now be apparent that this invention makes provision for an electronic circuit which, when used in a direct-recording, balanced-pressure engine indicator, allows a complete indicator diagram to be taken with only one pass of the stylus over the pressure range of the particular diagram.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without payment of any royalties thereon or therefor.

What is claimed as new and desired to be secured by Letters Patent of the United States is:

1. An engine pressure indicator of the character disclosed comprising, in combination, a drum connected to and rotatable with the engine crank-shaft, a pair of breaker points operable from the drum shaft as the piston of the engine reaches top dead center, a stylus mounted for sliding movement lengthwise of the drum and in spaced relation therewith sufficient to pass electrical discharges therebetween through a recording paper carried by the drum, a source of pressure, means to vary said pressure through a desired range, means responsive to said pressure for passing the stylus over the length of the drum as said pressure is varied, contact means including a diaphragm having opposite sides thereof exposed respectively to the pressure of the engine and the pressure of said source and constructed and arranged to be closed when the engine pressure exceeds the source pressure and to be opened when the source pressure exceeds the engine pressure, an electronic circuit connected to said stylus and responsive to the closing and opening operations of said contact means and said breaker points for supplying electrical discharges to the stylus, and switch means for transferring said electronic circuit between said contact means and said breaker points, said discharges received from the electronic circuit in response to operation of the contact means producing on said recording paper marks indicative of the rise and fall of the engine pressure during one pass of the stylus over the length of the drum, said discharges received from the electronic circuit in response to operation of the breaker points during an additional pass of the stylus over the drum producing on said recording paper a series of marks providing a top dead center line thereon.

2. An engine indicator of the character disclosed comprising, in combination, a drum connected to and rotatable with the engine crank-shaft, a stylus mounted for sliding movement lengthwise of the drum and in spaced relation therewith sufficient to pass electrical discharges therebetween through a recording paper carried by the drum, a source of pressure, means for varying said pressure, means responsive to the pressure of said source for passing the stylus over the length of the drum, contact means including a diaphragm having opposite sides thereof exposed respectively to the pressure of the engine and said source pressure and constructed and arranged to be closed when the engine pressure exceeds the source pressure and to be opened when the source pressure exceeds the engine pressure, an ignition type spark coil having a primary winding and a secondary winding connected between said stylus and said drum, an electronic circuit connected to said primary winding and to said contact means and including a pair of gaseous discharge devices, one of said discharge means being operable in response to the closing of said contact means for supplying an electrical pulse to the primary winding in accordance with the rise of the engine pressure with respect to said source and the other of said discharge means being operable for supplying an electrical pulse to said primary winding when the engine pressure subsequently falls below the source pressure, whereby to record both pressures during one pass of the stylus over the drum, and a unilateral element connected in parallel with said primary winding to prevent firing of said devices in response to the oscillatory voltage induced therein.

3. An engine pressure indicator of the character disclosed comprising, in combination, a drum connected to and rotatable with the engine crank-shaft, a stylus mounted for sliding movement lengthwise of the drum and in spaced relation therewith sufficient to pass electrical discharges therebetween through a recording paper carried by the drum, a source of variable pressure means responsive to said source of pressure for passing the stylus over the length of the drum, contact means including a diaphragm having opposite sides thereof exposed respectively to the pressure of the engine and said pressure source and constructed and arranged to be closed when the engine pressure exceeds the source pressure and to be opened when the source pressure exceeds the engine pressure, an ignition type spark coil having a primary winding and a secondary winding connected between said stylus and said drum, an electronic circuit connected to said primary winding and to said contact means and including a pair of grid controlled gaseous discharge devices, an adjustable source of negative potential connected to said control grids for biasing said discharge devices to a predetermined level, means in said circuit for supplying a positive signal to fire one of said discharge devices on closing of said contact means and to fire the other of said discharge devices on subsequent reopening of said contact means, said discharge devices having plate elements and shield grids respectively, cross coupling networks connected respectively from the shield grids to the plate elements of the other of the discharge devices for further biasing the unfired one of said gaseous discharge devices as the other of the devices is fired, and a unilateral element connected across said primary winding to prevent firing of said devices in response to the oscillatory voltage induced therein.

4. An engine pressure indicator of the character disclosed comprising, in combination, a drum connected to and rotatable with the engine crank-shaft, a stylus mounted for sliding movement lengthwise of the drum and in spaced relation therewith sufficient to pass electrical discharges therebetween through a recording paper carried by the drum, means including a valve adjustable at will and responsive to a source of calibrated pressure for passing the stylus over the length of the drum as the valve is adjusted progressively to increase the value of said calibrated pressure, contact means including a diaphragm having opposite sides thereof exposed respectively to the pressure of the engine and said calibrated pressure and constructed and arranged to be closed when the engine pressure exceeds the calibrated pressure and to be opened when the calibrated pressure exceeds the engine pressure, an ignition type spark coil having a primary winding and a secondary winding connected between said stylus and said drum, an electronic circuit connected to said primary winding and including an amplifier having the input thereof connected to said contact means for supplying electrical pulses to the primary winding selectively in accordance with the rise and fall of the engine pressure with respect to said calibrated pressure during one pass of the stylus over the length of the drum whereby electrical discharges are supplied to the stylus from said secondary winding in response to said pulses in the primary winding, means in said input circuit and including a resistor of optimum value for matching the impedance of said contact means over a wide range thereof with the input impedance of said amplifier, said amplifier producing a square wave signal corresponding to the interval between the closing and opening of said contacts, said electronic circuit including phase inverter means responsive to said square wave signal for producing therefrom two outputs which are mirror images in a phase sense, differentiating means for converting each of said outputs to voltage spikes of opposite polarity at the rise and fall of the square wave thereof, and a pair of grid controlled thyratrons respectively responsive to the voltage spikes of said outputs for supplying said electrical pulses to the primary winding.

5. In a pressure indicator or the like, a pair of contacts, pressure responsive means for closing said contacts when the pressure rises above a predetermined pressure and for reopening said contacts when the pressure falls below said predetermined pressure, indicating means, electronic circuit connected to said contacts and said indicating means for supplying an electrical pulse to said indicating means in response to said rise and fall of pressure, respectively, said circuit comprising means for producing an initial pulse of duration corresponding to the interval between opening and closing of said contacts, means for producing positive voltage spikes in phase, respectively, with the rise and fall of said initial pulse, and a pair of grid controlled discharge devices responsive, respectively, to the positive voltage spikes for supplying said electrical pulses to the indicating means whereby one of said devices fires in response to the closing of said contacts and the other fires in response to the opening of said contacts.

References Cited in the file of this patent

UNITED STATES PATENTS

| Number | Name | Date |
|---|---|---|
| 2,359,747 | Carleton | Oct. 10, 1944 |

FOREIGN PATENTS

| Number | Country | Date |
|---|---|---|
| 440,410 | Germany | Feb. 7, 1927 |

OTHER REFERENCES

"A New High Speed Engine Indicator," Taylor and Draper, Mechanical Engineering, vol. 55, pp. 169–171, 1933.